Dec. 30, 1930.  M. C. HEATON  1,787,371
LAMINATED GLASS ARTICLE
Filed June 27, 1928
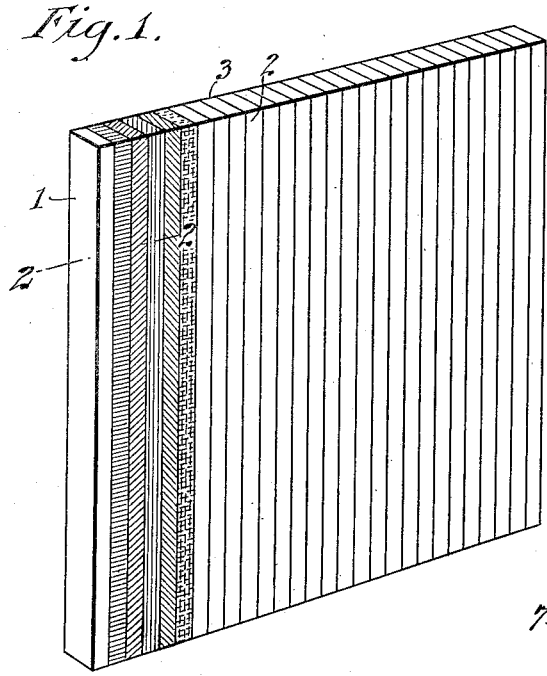
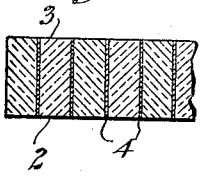
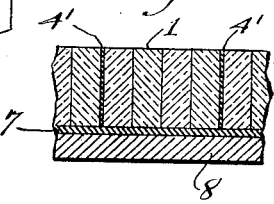
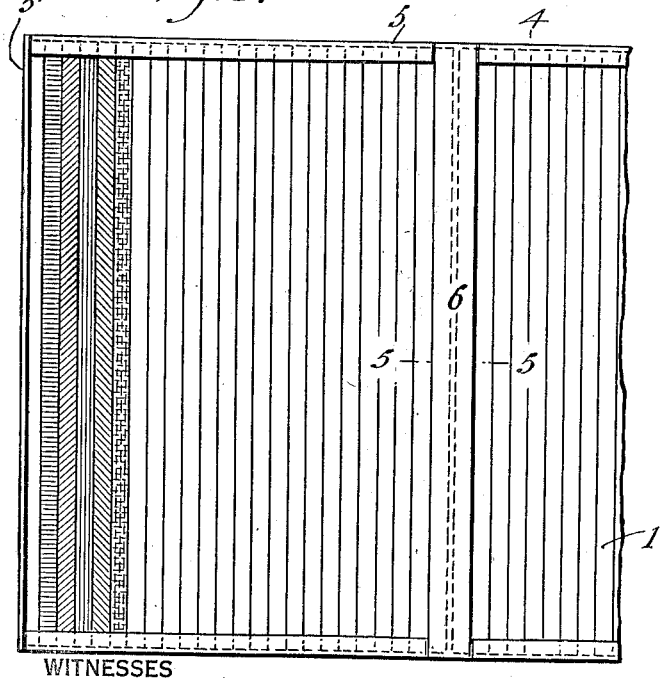
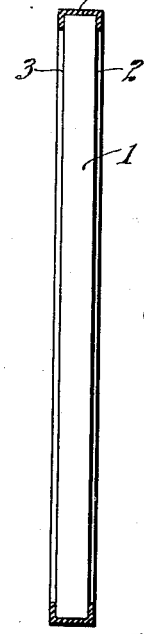
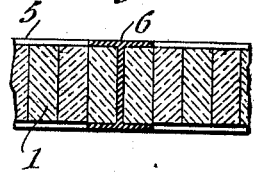
WITNESSES
Edw. Thorpe
A. L. Kitchin
INVENTOR
M. C. Heaton
BY
ATTORNEY Patented Dec. 30, 1930

1,787,371

UNITED STATES PATENT OFFICE

MAURICE C. HEATON, OF WEST NYACK, NEW YORK

LAMINATED GLASS ARTICLE

Application filed June 27, 1928. Serial No. 288,782.

This invention relates to glass articles, and particularly to a laminated article and the method of manufacturing the same, the object being to provide articles of different shapes with sheets of glass formed of laminations.

A further object, more specifically, is the production of a glass article and the method of manufacturing the same, which includes the assembling of selected glass strips and holding the same together by a framework or by an adhesive.

In the accompanying drawing,—

Figure 1 is a perspective view of a sheet or panel of glass disclosing an article manufactured according to the present invention;

Figure 2 is an enlarged fragmentary sectional view through Figure 1 on the line 2—2;

Figure 3 is a side view of a modified form of the invention to that shown in Figure 1;

Figure 4 is a sectional view through Figure 3 on the line 4—4;

Figure 5 is an enlarged fragmentary sectional view through Figure 3 on the line 5—5;

Figure 6 is a detail perspective view of a strip of glass similar to that shown in Figures 1 and 3.

Figure 7 is a fragmentary sectional view showing a slightly modified structure to that illustrated in Figure 1, the same illustrating how the invention may be used as a flooring or as a mosaic structure for various purposes.

Referring to the accompanying drawing by numerals, 1 indicates a narrow strip of glass which for ordinary use may be one-quarter of an inch wide and of any desired thickness, as for instance, one-eighth of an inch or less. For ornamental purposes sheets of glass are cut up into strips 1 and preferably differently colored strips are assembled, as shown in Figure 1. When assembled as shown in Figure 1, the edges 2 and 3 form the surface of the sheet or panel of glass. The various strips 1 are preferably secured together by adhesive 4, as shown in Figure 2, whereby a sheet or block of glass is provided with the edges of the strips forming the obverse and reverse faces of the article. When light shines through the article or panel of glass it must pass through the various strips 1 from one edge to the other, and thereby the strips act in a certain sense as prisms, so that a desired effect is secured. As shown at the left of Figure 1 some of the strips 1 are of colored glass, but if desired, the entire article could be made of clear glass of one color or of many colors arranged in any desired order. After the panel or sheet has been produced, as shown in Figure 1, it may be then used as part of a lampshade or in any other place, as preferred.

Under some circumstances instead of using adhesive 4, as shown in Figure 2, a frame is provided for holding or supporting the various strips 1. As shown in Figure 3, this frame is provided with top and bottom holding members 5 which are U-shaped in cross-section. In addition, as shown in Figure 3, a division member 6 is provided which is H-shaped in cross-section (Figure 5), whereby panels are separated. At the end of the frame a single flat strip 5' is provided which may be soldered or otherwise secured to the members 5, while these members are soldered or otherwise rigidly secured to member 6, and when secured hold the strips 1 properly in place. It is of course understood that the various strips 1 may be of clear glass or may be colored, as desired, with the colored strips arranged in any desired order.

In Figure 7 a further modified structure is shown, wherein the strips 1 are held principally in place by a layer of cement or other adhesive 7, whereby the strips 1 may be connected to a support 8. In this form of the invention adhesive could be arranged between each of the strips 1, but preferably only layers of adhesive 4' are provided at intervals. This arrangement is desirable when the invention is used as a floor covering and even when used on a vertical wall as a panel or for other purpose. A mosaic formation may be provided with this form of the invention, or in fact with any form of the invention disclosed. When forming a panel either as shown in Figures 1, 3 or 7, a complete solid structure may be provided as illustrated, though, if desired, parts of certain strips may be removed and openings left or short sections of differently colored strips inserted in order to secure a desired effect.

It will be noted that by reason of the fact that the cut or broken edges of the various strips 1 form the front and rear faces of the panel, a pleasing appearance is produced which will cause a diffusion of the light when projected through the panel. Under some circumstances the strips may be silvered on one face or cut from an ordinary mirror and when this is done the reflection from these mirrored or silvered surfaces will produce a deflection of the light in a very pleasing manner.

What I claim is:—

A laminated glass article comprising a plurality of narrow strips of glass arranged in contact so that their side edges will form the respective faces of a panel, a layer of cement arranged between groups of said strips and a backing of cement covering one edge of all of said strips of glass, said backing merging into said layers of cement whereby all the parts are locked together.

MAURICE C. HEATON.